United States Patent
Tegethoff et al.

(10) Patent No.: US 12,517,090 B2
(45) Date of Patent: Jan. 6, 2026

(54) METHOD FOR PRODUCING AND TESTING A HIGH-STRENGTH TUBE PRODUCT OF STEEL, AND ALSO TEST PROBE AND TUBE PRODUCT

(71) Applicant: BENTELER Steel/Tube GmbH & Co. KG, Paderborn (DE)

(72) Inventors: Dirk Tegethoff, Salzkotten (DE); Daniel Thoele, Paderborn (DE); Harald Krause, Halle (DE); Daniel Luecke, Brakel (DE)

(73) Assignee: BENTELER Steel/Tube GmbH & Co. KG, Paderborn (DE)

( * ) Notice: Subject to any disclaimer, the term of this patent is extended or adjusted under 35 U.S.C. 154(b) by 0 days.

(21) Appl. No.: 17/584,989

(22) Filed: Jan. 26, 2022

(65) Prior Publication Data

US 2022/0244219 A1    Aug. 4, 2022

(30) Foreign Application Priority Data

Jan. 29, 2021   (DE) .......................... 102021102086.7

(51) Int. Cl.
  *G01N 27/90*    (2021.01)
  *G01N 33/20*    (2019.01)

(52) U.S. Cl.
  CPC ............. *G01N 27/90* (2013.01); *G01N 33/20* (2013.01)

(58) Field of Classification Search
  None
  See application file for complete search history.

(56) References Cited

U.S. PATENT DOCUMENTS 3,517,536 A * 6/1970 Thomas ................ B21C 37/202
                                             72/340
4,797,613 A   1/1989 Wentzell
(Continued)

FOREIGN PATENT DOCUMENTS

CN    111024810    4/2020
DE    19641888    5/1998
(Continued)

OTHER PUBLICATIONS

Nam Min; Eddy Current Test Probe for Transient Zone of Steam Generator Tubes in Nuclear Power Plant and Method for Testing Section Change of Transient Zone With Using Thereon; Date Published Nov. 20, 2012; KR 101203263 B1; Korea Hydro and Nuclear Power Co. CPC F 22 B 37/002 (Year: 2012).*

(Continued)

*Primary Examiner* — Nasima Monsur
(74) *Attorney, Agent, or Firm* — Sheridan Ross P.C.

(57) ABSTRACT

The invention relates to a method for producing and testing a high-strength tube product of steel, having the following steps:
  a) providing a steel tube,
  b) forming the steel tube to afford the tube product, with the steel tube being formed at least in one of its end regions,
  c) testing the inner wall and the outer wall in at least one formed end region of the tube product for defects by means of a test probe, which is matched to at least one formed end region and comprises at least one eddy current sensor for testing the inner wall and at least one eddy current sensor for testing the outer wall of the at least one formed end region of the tube product, with (Continued)

multiple sensors being provided on at least one arm and/or multiple sensors being provided on an inner part.

15 Claims, 6 Drawing Sheets

(56) References Cited

U.S. PATENT DOCUMENTS

| | | | |
|---|---|---|---|
| 10,101,301 B2* | 10/2018 | Ye | G01N 27/9006 |
| 10,788,456 B2 | 9/2020 | Lee et al. | |
| 2005/0200355 A1* | 9/2005 | Hatcher | G01N 27/902 |
| | | | 324/239 |
| 2007/0129154 A1* | 6/2007 | Valovick | B21K 1/063 |
| | | | 464/170 |
| 2010/0102808 A1* | 4/2010 | Boenisch | G01N 27/9046 |
| | | | 324/240 |
| 2015/0204752 A1* | 7/2015 | Miller | G01M 3/183 |
| | | | 29/407.05 |
| 2016/0231282 A1 | 8/2016 | Koenig et al. | |
| 2017/0009321 A1* | 1/2017 | Balun | C22C 38/02 |
| 2017/0297369 A1 | 10/2017 | Walterfang et al. | |
| 2019/0331730 A1* | 10/2019 | Miller | E21B 17/042 |
| 2020/0182832 A1* | 6/2020 | Lazzari | G01N 29/221 |

FOREIGN PATENT DOCUMENTS

| | | |
|---|---|---|
| DE | 102013002775 | 3/2014 |
| DE | 102015111150 | 1/2017 |
| DE | 102016107143 | 10/2017 |
| DE | 102018106546 | 9/2019 |
| DE | 102018123316 | 3/2020 |
| DE | 102019103502 | 8/2020 |
| EP | 1474538 | 11/2006 |
| EP | 3233577 | 6/2018 |
| GB | 1371055 | 10/1974 |
| JP | H08-201347 | 8/1996 |
| JP | 2008-032575 | 2/2008 |
| WO | WO 99/04253 | 1/1999 |

OTHER PUBLICATIONS

Official Action with Machine Translation for German Patent Application No. 102021102086.7, dated Oct. 1, 2021, 10 pages.
Invitation for Oral Hearing with Machine Translation for German Patent Application No. 102021102086.7, dated Dec. 7, 2023, 9 pages.
Official Action with English Translation for China Patent Application No. 202210104236.4, dated Jan. 27, 2025, 13 pages.
Extended Search Report with Machine Translation for European Patent Application No. 22152384.8, dated Jun. 30, 2022, 12 pages.

* cited by examiner

METHOD FOR PRODUCING AND TESTING A HIGH-STRENGTH TUBE PRODUCT OF STEEL, AND ALSO TEST PROBE AND TUBE PRODUCT

CROSS-REFERENCE TO RELATED APPLICATIONS

This application claims the benefit of German Patent Application No. 10 2021 102 086.7 filed Jan. 29, 2021, the entire contents of which are incorporated herein by reference in its entirety.

FIELD

The invention relates to a method for producing and testing a high-strength tube product, to a test probe, in particular for use in the method, and to a tube product produced by the method.

BACKGROUND

High-strength or ultra-high-strength tube products of steel find use in many technical and industrial applications. The production of such high- or ultra-high-strength tube products of steel is described for example in EP 3 233 577 B1, DE 10 2018 106 546 A1, DE 10 2018 123 316 A1 and DE 10 2019 103 502 A1 for a variety of applications. In particular, airbag tubes in the form of such tube products are also described in these documents.

Such high- or ultra-high-strength tube products of steel must be tested for lack of defects, in particular in the regions formed from an original steel tube during the production of the tube product, on account of the loading to which said tube products are subject in the technical and/or industrial applications provided therefor. Here, the tubes can be formed by a multiplicity of conventional forming processes, such as for example hot forming and cold forming.

Within the meaning of the present invention, what is worked on in particular is the testing of formed end regions of a high-strength tube product. For the purpose of checking, various possibilities are available in this context. On the one hand, it is possible to carry out ultrasonic testing of the tube product in a liquid (coupling medium), although it needs to be taken into consideration here that the tested tube product must be cleaned and dried again after the testing for the purpose of further processing, this meaning a higher expenditure of energy and/or time when the tube product is being produced and tested. In addition, the liquid used can possibly result in corrosion of the high-strength tube product. Moreover, this testing technology does not make it possible to reliably detect all of the relevant types of defect.

Another possibility for testing the surfaces in the formed end regions of a tube product consists in the use of eddy current testing using corresponding eddy current sensors. Eddy current testing in this context is both contactless and nondestructive, and although it can only be used to test electrically conductive materials, with tube products of steel this is the case. In eddy current testing, what is utilized is the effect that impurities and damage in an electrically conductive material also have a different conductivity or a different permeability than the actual material. Here, the measurement signal depends on the three parameters conductivity, permeability and distance between the detector and the material surface, and therefore in this way on the one hand damage to the surface of the object to be tested can be found. On the other hand, with eddy current testing it is also possible to measure the layer thickness and to test the material properties, in particular to test the microstructure. Within the context of the invention, in the present case the focus is substantially on testing the surfaces or wall faces of the tube product produced in its formed end regions for defects.

When testing for damage to the surface or wall face, a corresponding eddy current sensor is moved over the object to be tested. Provided that the electrical resistance is homogeneous and the eddy currents therefore flow unhindered in the material, there is no damage to the material or the surface. Both in the event of damage to the material or to the surface and in the event of an inclusion of a foreign material in the sample wall to be checked, the resistance and the eddy current strength change. This change can be detected by means of eddy current testing and can be made visible or perceptible via an evaluation logic using corresponding imaging methods. In this context, the coils of the eddy current sensors used are connected such that small changes in the material properties or in the distance between the eddy current sensor and the material surface can largely be compensated.

DE 196 41 888 A1 discloses for example the testing of weld seams in the interior of reactor control rod sheaths using a corresponding eddy current probe. Furthermore, WO 99/04253 A1 discloses internal testing of a tube inner wall by means of eddy current testing. U.S. Pat. No. 10,788,456 B2 likewise discloses testing an internal tube by means of eddy current testing.

In all the known methods, the surface of the tube inner region is certainly tested for defects. However, when a steel tube is being formed to afford a tube product, damage can occur not only on the inner walls of the tube product, but also on its outer walls. Even if the inner walls of the tube product are free of defects, damage to the surface of the outer wall of the tube product, in particular in its formed end regions, can lead to malfunction when the tube product is properly used or even to destruction of the tube product itself. Although the outer wall of the tube product in its formed end portions can likewise be tested in this way, this is associated with a higher expenditure of time, material and costs.

SUMMARY

Embodiments of the present disclosure provide a method for producing and testing a high-strength or ultra-high-strength tube product of steel which makes it possible to cost-effectively test the formed end regions of a high-strength or ultra-high-strength tube product of steel in a time-saving and material-saving manner. Embodiments of the present disclosure also provide a corresponding test probe for use in the method according to the invention and lastly a corresponding tube product.

The method according to the invention for producing and testing a high-strength tube product of steel has the following method steps:

a. providing a steel tube, which can be designed both without a seam and with a weld seam,
b. forming the steel tube to afford the tube product, the steel tube being formed at least in one of its end regions,
c. testing the inner wall and the outer wall in at least one formed end region of the tube product for defects by means of a test probe which is matched to the at least one formed end region and comprises at least one eddy current sensor for testing the inner wall and at least one eddy current sensor for testing the outer wall of the at least one formed end region of the tube product, with multiple sensors being provided on at least one arm and/or multiple sensors being provided on an inner part.

The method according to the invention makes it possible to easily check both the outer wall and the inner wall of a formed end region of a tube product of steel for defects and damage by means of eddy current testing, without requiring additional time and also an additional test stand owing to the additional checking of the surface in the outer region of the end product of the tube product. The test probe is designed such that it comprises eddy current sensors, which simultaneously check the surface of the inner wall and the surface of the outer wall of the at least one formed end region of the tube product. However, not only does the method according to the invention optimize the expenditure of time for testing the surface of the outer and inner wall, but also it is possible, when additionally testing the surface of the outer wall of the at least one formed end region of the tube product, to resort to the same evaluation electronics that are also used to test the inner wall of the at least one formed end region of the tube product. The result of this is that overall the measuring resolution and detection rate for certain types of defects is improved or actually reliably enabled compared to individual testing by ultrasound or eddy current testing performed on one side. Lastly, even the device outlay for checking the inner wall and outer wall of the at least one formed end region of the tube product is also minimized thereby. In this respect, multiple sensors are provided on at least one arm and/or multiple sensors are provided on the inner part, with the result that for example testing is carried out at different measuring frequencies and/or sensitivities in order to detect different types of defect and/or defects at different depths in the tube wall, or in order for example to be able to investigate relatively long tube portions at the same time.

Within the meaning of the invention, inner wall is understood to mean the inner wall face or that part of the tube wall that proceeds from the inner wall surface. At the same time, within the meaning of the invention, outer wall is understood to mean the outer wall face or that part of the tube wall that proceeds from the outer wall surface.

A first advantageous configuration of the method according to the invention provides that the inner and the outer wall are tested at the same time. This parallel testing makes it possible to at least halve the duration of the testing in comparison with serial testing.

In this context, it has proven to be especially advantageous that the inner wall and the outer wall of the at least one formed end region of the tube product are tested in such a way that the tube product is fixed and the test probe is moved in rotation axially over the at least one formed end region of the tube product, with both the inner wall and the outer wall of the at least one formed end region of the tube product being checked for defects by means of the eddy current sensors. The axial and rotating movement of the test probe ensures that the eddy current probes are moved over the entirety of the surfaces of the inner wall and of the outer wall of the at least one formed end region of the tube product, and therefore complete testing both of the inner wall and of the outer wall of the at least one formed end region can be ensured.

The embodiment of the method according to the invention in which the inner wall and the outer wall in the at least one formed end region of the tube product are simultaneously tested directly after the final production steps, in particular after the forming according to step b), and in particular cyclically linked therewith, has proven to be especially advantageous. This measure makes it possible to test the surfaces of the inner wall and outer wall of the formed end region during the production step or directly thereafter without it being necessary to provide a separate test stand. In this respect, logistical outlay for feeding the tube products produced to a separate test stand together is omitted.

A further embodiment of the method according to the invention provides that the testing takes place after demagnetization of the at least one formed end region. This avoids erroneous detections owing to magnetic characteristics possibly present in the formed end region.

In a further advantageous configuration of the method according to the invention, the steel tube provided consists of a steel alloy, which, apart from iron and unavoidable melting-related impurities, comprises the following alloy elements in percent by mass, with the specified percentages below in the present document always relating to percent by mass:

C (0.07% to 0.50%; preferably 0.08% to 0.15%), Si (0.01% to 0.60%; preferably 0.01% to 0.50%), Mn (0.3% to 1.7%; preferably 1.0% to 1.7%), Cr (at most 1.2%; preferably 0.2% to 0.9%), Mo (at most 1.2%; preferably at most 0.2%), Ni (at most 0.4%; preferably 0.15% to 0.4%), Al (0.01% to 0.10%), V (at most 0.15%), Nb (at most 0.06%) and Ti (at most 0.06%).

Melting-related impurities are in particular impurities that end up in the steel alloy when the steel is being produced, in particular as a result of producing the melts and treating the materials added to the melt.

According to the invention, carbon (C) is present in the steel in an amount ranging from 0.07% to 0.50%. With a carbon content of 0.07%, it is still possible to ensure sufficient strength and keep the formation of cementite $Fe_3C$ in the steel low. In addition, sufficient toughness can be ensured. An excessive carbon content, by contrast, favors the formation of carbide in the steel, as a result of which the notch impact strength lowers. According to the invention, the carbon content is therefore preferably restricted to at most 0.15%. According to one embodiment, the carbon content may range from 0.08% to 0.15%.

Silicon (Si) is preferably present in an amount ranging from 0.01% to 0.60%, preferably ranging from 0.01% to 0.50%. Silicon increases the tensile strength and yield point of the steel tube produced.

Manganese (Mn) is preferably present in an amount ranging from 0.3% to 1.7%. Manganese increases the yield point and strength of the steel alloy. In addition, manganese, as a replacement for carbon, improves the weldability. According to a preferred embodiment, manganese is present in an amount ranging from 0.5% to 1.7% and particularly preferably ranging from 0.6% to 1.7%.

Chromium (Cr) is preferably present in an amount of at most 1.2%. Chromium increases the toughness and tensile strength of the steel alloy. According to a preferred embodiment, chromium is present in an amount of at most 1.0% and particularly preferably ranging from 0.2% to 0.9%.

Molybdenum (Mo) is preferably present in an amount of at most 1.2%, in particular at most 0.2%. Molybdenum improves in particular the tensile strength and weldability of the steel alloy.

Nickel (Ni) is preferably present in an amount of at most 0.4%, preferably of between 0.15% and 0.4%. Nickel increases the tensile strength and the yield point.

Aluminum (Al) is preferably present in an amount ranging from 0.01%-0.10%.

Vanadium (V) is preferably present in an amount of at most 0.15%. Vanadium increases the tensile strength of the alloy.

Niobium (Nb) is preferably present in an amount of at most 0.06%.

Titanium (Ti) is preferably present in an amount of at most 0.06%.

In another configuration of the method according to the invention, the tube product has a microstructure of expanded, tempered martensite, in particular with an average martensitic packet size of $d_{avg} < 3$ μm. Such properties of the tube product may be realized for example by annealing (i.e. by hardening and subsequent tempering) and cold drawing after the annealing, in particular before the testing described in step b).

According to a further embodiment of the method according to the invention, the tube product, in particular the airbag tube, has a microstructure of expanded, tempered martensite. This microstructure is preferably obtained in particular by a heat treatment with subsequent cold drawing.

According to an alternative embodiment, a tube product, in particular an airbag tube, may also consist of an air-hardenable steel alloy, as is disclosed for example in EP 1 474 538 A2. This steel alloy, and also the tube production steps disclosed in said document, form part of the present disclosure in terms of step a) of patent claim 1, specifically providing the steel tube.

The tube product preferably has a transition temperature below 233.15 K. The transition temperature is preferably determined by the Charpy notch impact test for round samples. For example, in this respect the transition temperature is determined by taking a sample in the respective length portion in the form of an annular notch-impact sample, that is to say in the form of a narrow tube portion with a nominal notch introduced for test purposes. After being cooled down to the low temperature condition of the test, an axial impact is effected on the sample. The temperature at which the fracture behavior of the samples transitions from ductile to brittle is referred to as the transition temperature. It goes without saying that, to determine the transition temperature, multiple samples must be tested for characterizing one length portion.

In addition to airbag tubes, the following further tube applications can be produced by or used in the method according to the invention. Drive shafts, stabilizers and axle components, in particular of an air-hardening steel alloy, as are disclosed in DE 10 2017 297 369 A1, DE 10 2016 107 143 A1 and DE 10 2015 111 150 A1. The steel alloys and tube production steps disclosed in these documents form part of the present disclosure in terms of step a) of patent claim 1, specifically providing the steel tube, and step b), forming the steel tube to afford the tube product.

Further preferably, the tube product and/or the steel tube provided have/has a wall thickness of less than 4 mm. Such a wall thickness can in particular also be used in airbag tubes.

It is especially advantageous when testing for defects in the transition region is effected by moving an eddy current sensor in the undercut of the transition region of the inner or outer wall. This ensures that the eddy current sensors can be guided in the transition region up to the transition region such that there they are at a distance from the wall of the transition region and enable detection and thus testing. This guiding up can be realized by corresponding mechanisms in the arms and/or the inner part. What should be mentioned only by way of example in this respect is the splaying of a sensor mount, a transversely moved sensor mount, or else a segmented test probe, this list not being exclusive.

In principle, in the context of the method according to the invention it is also possible to incorporate a distance compensation. This compensates a rotation-related and/or clamping-related distance variation between the eddy current sensors and the wall surfaces, for example in terms of the defect evaluation, the electronics and/or the software used.

The test probe according to the invention is distinguished in that it comprises a web which connects a first and a second arm to one another, on the inner walls of which at least one respective eddy current sensor is arranged, with a holding element for receiving at least one eddy current sensor being attached on the web between the first and the second arm. A constructed test probe of this kind provides in a simple manner simultaneous testing of the outer and the inner wall of a tubular element, in particular of a tubular product, that has been produced by the method described above. By virtue of the eddy current sensors arranged on the inner walls of the first and the second arm, which arms are arranged on the web, it is possible to easily test the surface of the outer wall of an end region of a tube product, while the at least one eddy current sensor arranged on the holding element is designed for checking the inner wall of the end region of a tube product. By rotating and axially moving the test probe over the end region of the tube product, it is thus possible to check the entire surface of the inner wall and of the outer wall for defects and damage by means of the test probe.

It is especially advantageous here when the holding element is attached on the web equidistantly from the first and the second arm. This configuration of the invention ensures that, when the arms rotate over the end region of the tube product, both arms are at the same distance from the outer wall of the tube product. In this respect, directly oppositely situated eddy current sensors on the two arms would in that case also supply exactly the same signals, such that they would be equivalent to one another and redundant testing would also be possible. Indeed, an oppositely situated arrangement of eddy current sensors on the two arms is not provided, since a defect of one eddy current sensor could also be established or immediately shown by the other. In this respect, the geometry of the inner walls of the two arms can be matched to the geometry of the end region to be checked of a tube product, and therefore, by virtue of correspondingly arranged eddy current sensors, they are always at the same distance from the surface being checked of the formed end region of the tube product.

According to an especially advantageous configuration of the invention, the test probe is in the form of a rotary body about a central longitudinal axis, the web region being in the form of a circular disk, the two arms together being in the form of a hollow cylinder arranged on the edge of the circular disk, and the holding element being in the form of a solid cylinder arranged around the center of and on the circular disk. A test probe of this type can easily be shaped, in particular milled, from a solid metal body, it proving particularly advantageous that a solid body of this type has a high weight and therefore is relatively insensitive to slight unbalances that arise during the rotation. This is therefore important in particular since the individual eddy current sensors of the test probe are arranged at different locations on the rotary body and could therefore give rise to slight unbalances during rotation. In the case of a solid test probe, in particular one made of a metal, the weights of the eddy current sensors are therefore decreased, such that the slight unbalances created by the sensors are not disruptive during the rotation of the test probe in the form of a rotary probe. Such a test probe in the form of a rotary body is also referred to below as barrel probe, if appropriate.

As an alternative, it is possible that the test probe specifically does not have the geometry of a rotary body. This is the case in particular when it has only one arm for testing an outer wall. The holding element for testing inner walls may likewise be in the form of an arm, which protrudes from the web of the test probe and can be inserted into the interior of a tube to be tested.

In the process, the test probe can be moved perpendicularly to the axis of rotation of the tube to be tested, in order to be able to move the arm for testing outer walls and the holding element for testing inner walls up to undercuts at the ends of the tube to be tested. The geometry of the arm and of the holding element is matched to the geometry of the tube end to be tested in this case. If now the tube end is tested, the axis of rotation of the test probe corresponds to the central longitudinal axis of the tube to be tested.

Further aims, advantages, features and possible applications of the present invention will emerge from the following description of exemplary embodiments with reference to the drawings. In this respect, all of the features described and/or illustrated in the figures form the subject matter of the present invention individually or in any desired meaningful combination, irrespective of how they are combined in the claims or how the claims refer back.

DETAILED DESCRIPTION

Figure 1:
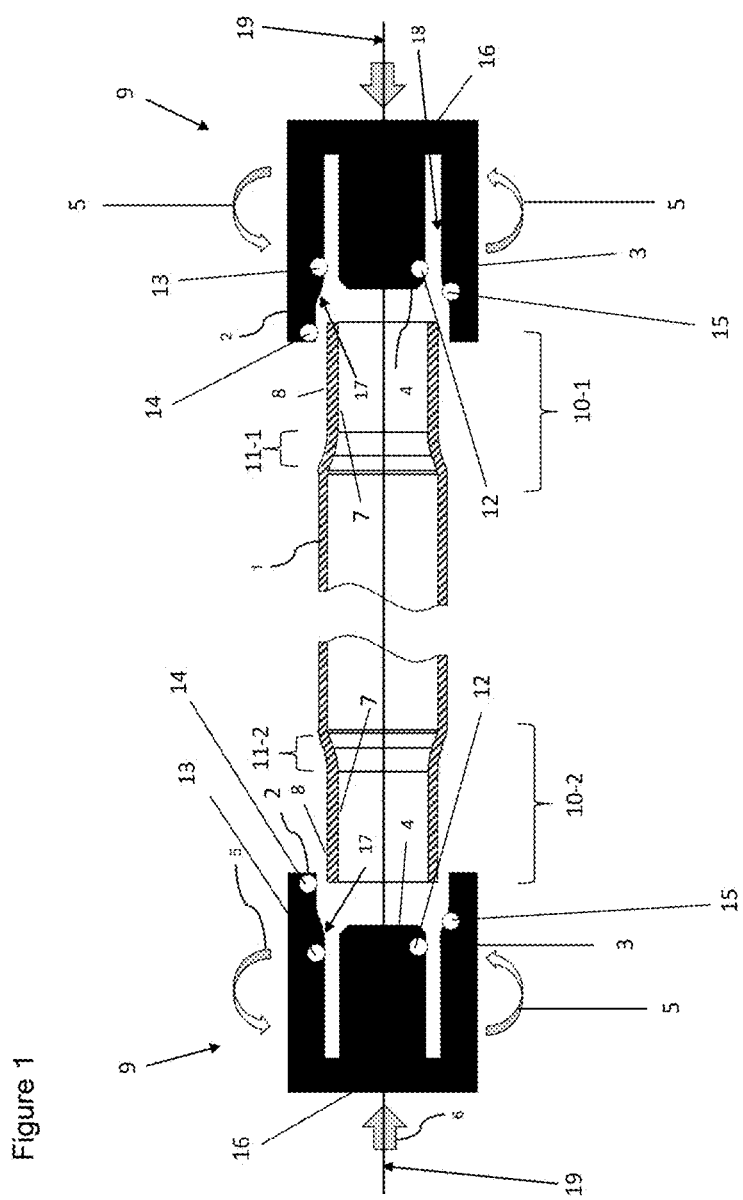
FIG. 1: illustrates the start of the testing step of the method according to the invention for testing two formed end regions of a tube product according to the invention using test probes according to the invention.

FIG. 1 illustrates a tube product 1 according to the invention, in particular an airbag tube, having formed end regions 10-1, 10-2, which are to be tested for defects of the inner wall 7 and of the outer wall 8 in the formed end regions 10-1, 10-2 of the tube product 1 by means of a respective test probe 9. The end regions have a transition region 11-1, 11-2 between the formed or reduced cross section of the tube product 1 and the cross section of the steel tube provided. The illustration of FIG. 1 shows the start of testing. The tube product 1 is formed in such a way here that its end regions 10-1, 10-2 were narrowed during its production. In further exemplary embodiments which are not illustrated here, it is also conceivable that the end regions of the tube product were widened. In this context, the forming during the production of the tube product from a steel tube may be effected by known methods which are not explained in more detail here.

The end regions 10-1 and 10-2 of the tube product 1 are rotationally symmetrical and have an inner wall 7 and an outer wall 8. In order to test for defects on the inner walls 7 and outer walls 8 in the end regions 10-1 and 10-2 of the tube product 1, in the present case two test probes 9 are used. The test probes 9 consist here of a web 16, which connects a first arm 2 and a second arm 3 to one another, with a holding element 4 spaced apart equidistantly from the two arms 2 and 3 being arranged on the web 16. Arranged on the two arms 2 and 3 are eddy current sensors 13, 14 and 15, which are positioned in such a way that they can test regions of different diameters of the end regions 10-1, 10-2 of the tube product 1, the distances between the eddy current sensor 13, 14 and 15 and the respective region of the outer walls 8 being substantially the same. An eddy current sensor 12, using which the inner walls 7 of the end regions 10-1 and 10-2 of the tube product are checked for defects, is likewise arranged on the holding element 4.

Since the illustration of FIG. 1 is shown in the manner of a sectional illustration, it should also be noted with respect to the test probes 9 that they are solid elements of metal in the form of a rotary body here, and therefore the web 16 is in the form of a circular disk, while the two arms 2 and 3 together form a hollow cylinder and are arranged on the edge of the web 16, which is in the form of a circular disk. In the same way, each holding element 4 is in the form of a solid cylinder on the web 16, which is in the form of a circular disk, and is arranged on the center of said web. Although, after the forming, the end regions 10-1, 10-2 according to FIG. 1 are identical and have the same cross section and the same transition regions 11-1, 11-2, it is also possible that the cross-sectional geometry, the length and the width of the transition regions 11-1 and 11-2 are different. Accordingly, the test probes 9, despite having the same reference signs, may also differ in terms of details, in particular may be matched to the geometry of the end regions 10-1, 10-2. In addition, test probes 9 according to the invention also do not have to be in the form of a rotary body. If they are in the form of a rotary body, however, they do not necessarily have to be formed from solid elements of metal. Hollow elements with sheet-metal walls would also be conceivable, for example. In addition, the material from which the test probe is made is also not restricted to metals.

As already mentioned, the illustration of FIG. 1 shows the situation at the start of testing of the end regions 10-1 and 10-2 of the tube product 1 for defects. The test probes 9 are meanwhile already rotating, with the arrows 5 indicating the direction of rotation and the rotation taking place about the central longitudinal axis 19. In addition to the rotational movement 5, the test probes 9 also undergo an axial movement, which is indicated by the arrows 6.

During the axial movement of the test probes 9, they continue to rotate about the central longitudinal axis 19, with the result that the surfaces of the outer walls 8 and inner walls 7 in the end regions 10-1 and 10-2 of the tube product 1 can be checked for defects and damage over their full surface area by means of the eddy current sensors 12 to 15.

Figure 2:
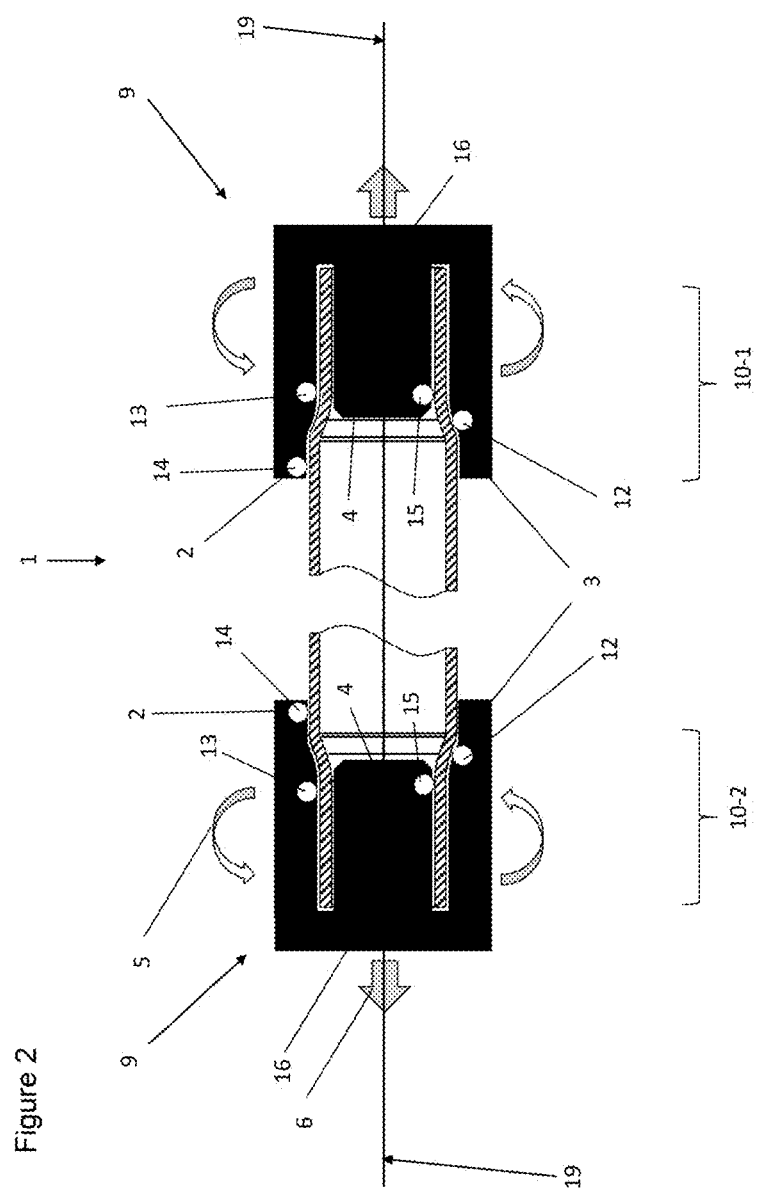
FIG. 2: illustrates the testing of the end portions of the tube product of FIG. 1 at the end of testing.

In the process, the test probes 9 are moved in the axial direction until the test probes 9 have reached the position illustrated in FIG. 2. In this position, the end regions 10-1, 10-2 of the tube product 1 are immersed completely in the test probes 9, and therefore the outer and inner walls 8 and 7 of the tube product 1 have already been completely checked once. The checking is hereby finished and the test probes 9 can be moved back to their starting position according to FIG. 1. In this respect, it is now possible to already forego rotation of the test probes 9, since a complete check of the surfaces of the inner walls 7 and of the outer walls 8 in the end regions 10-1 and 10-2 of the tube product has already been effected. As an alternative, it is possible to also carry out a second check of the surfaces on the inner walls 7 and the outer walls 8 of the tube product 1 while the test probes 9 are being moved out of the end regions 10-1 and 10-2 of the tube product 1.

If no defects were found during the check of the end regions 10-1 and 10-2 of the tube product 1, the tube product 1 is supplied to its further use. However, should defects or damage have been detected during the check, the corresponding tube product 1 is rejected.

Figure 3:
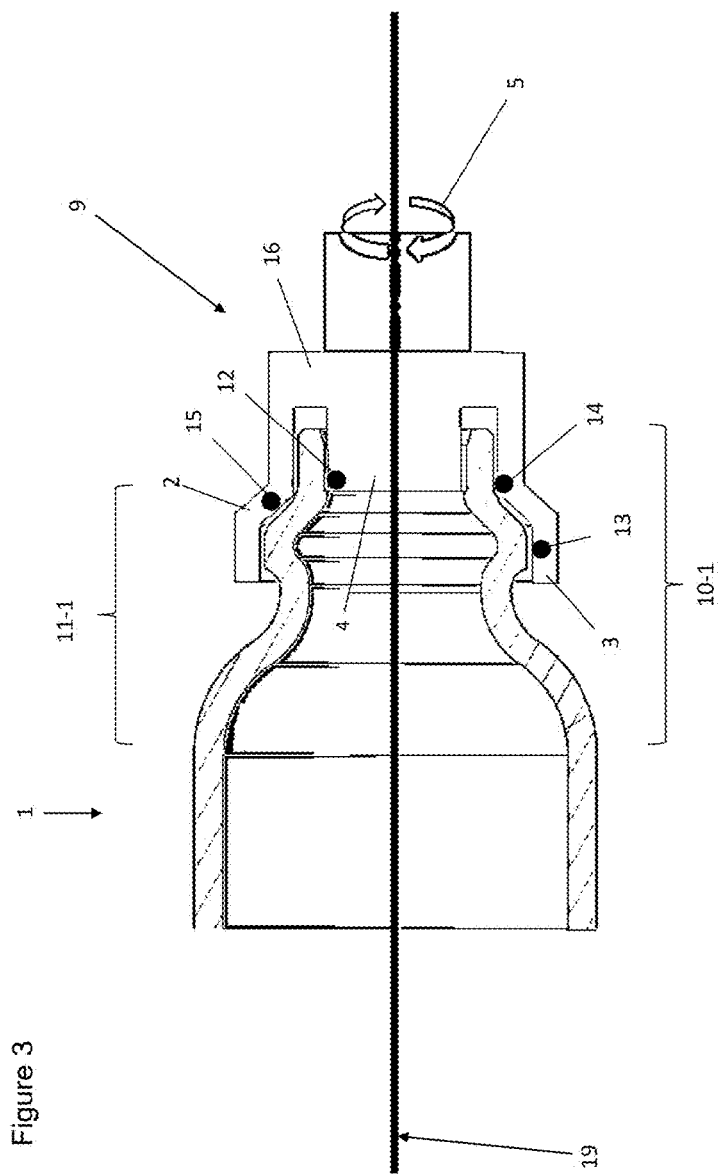
FIG. 3: illustrates the testing of an end portion of a further tube product at the end of testing using a further test probe according to the invention.

FIG. 3 illustrates the testing of an end portion of a further tube product 1 at the end of testing using a further test probe 9 according to the invention. The structure of the test probe 9 corresponds substantially to that of FIGS. 1 and 2 and is therefore provided with identical reference signs. However, the end region 10-1 of the tube product 1 of FIG. 3 is different than the end region of the tube product of FIGS. 1 and 2 and although it also has a narrowed form in a transition region 11-1, it additionally has an outwardly formed bead. The testing is carried out similarly to the testing described in FIGS. 1 and 2 and therefore is not rendered again here.

Figure 4:
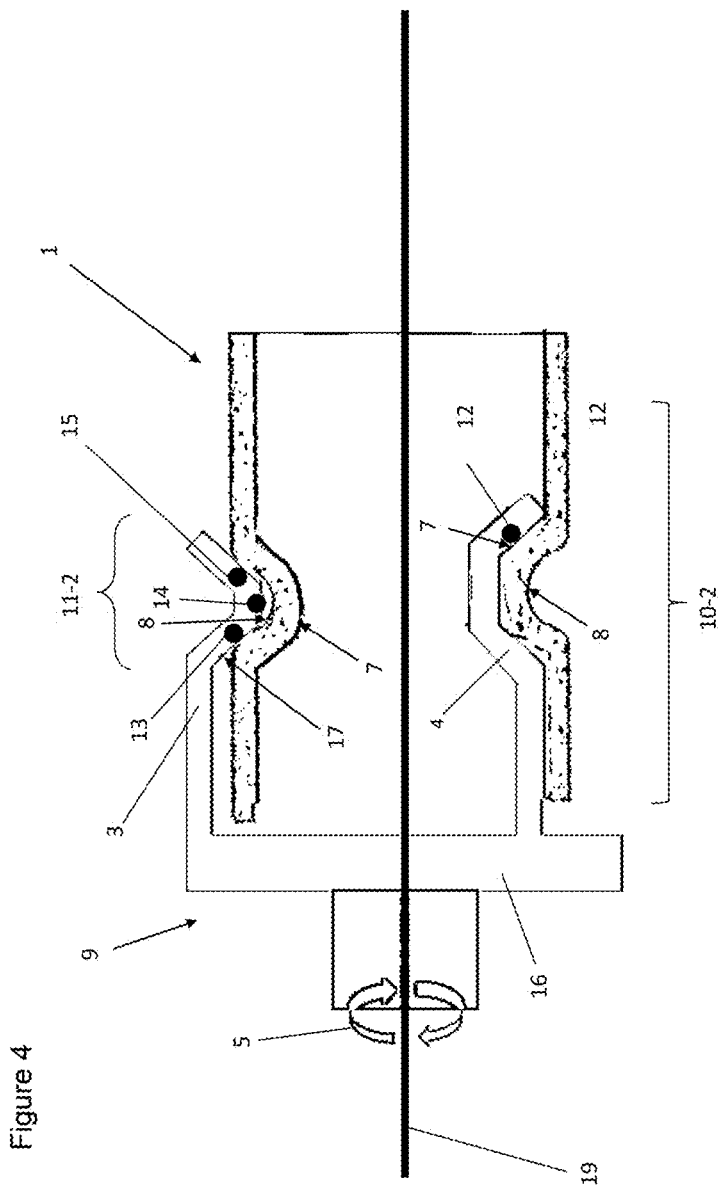
FIG. 4: illustrates the testing of an end portion of a further tube product at the end of testing using a further test probe according to the invention.

FIG. 4 shows the testing of an end portion of a further tube product 1 at the end of testing using a further test probe 9 according to the invention. The end regions 10-2 of the tube product in this figure do not narrow this time, but rather a transition region 11-2 of said tube product has a bead directed toward the inside of the tube. The test probe 9 used here is this time not rotationally symmetrical about its axis of rotation, which corresponds to the central longitudinal axis 19 of the tube product. Instead, the test probe 9 has a web 16, at one end of which is arranged an arm 3 which is provided on its inner wall 17 with three eddy current sensors 13, 14 and 15, in order to test the outer wall 8 of the tube product in the region of the bead. The test probe also has a holding element 4, which here likewise is in the form of an arm and is arranged on the web 16 opposite the arm 3. This holding element 4 is fitted with an eddy current sensor 12 for testing the inner wall 7 of the tube product 1 in the region of the bead of the end region 10-2. In this case, the arm 3 and the holding element 4 are at different distances from the axis of rotation of the test probe 9, with the result that, when the test probe 9 is rotating, the holding element 4 is guided along on the outer wall 8 of the tube product 1 in its end region 10-2, while the holding element is guided along on the inner wall 7 of the tube product 1 in its end region 10-2.

Figure 5:
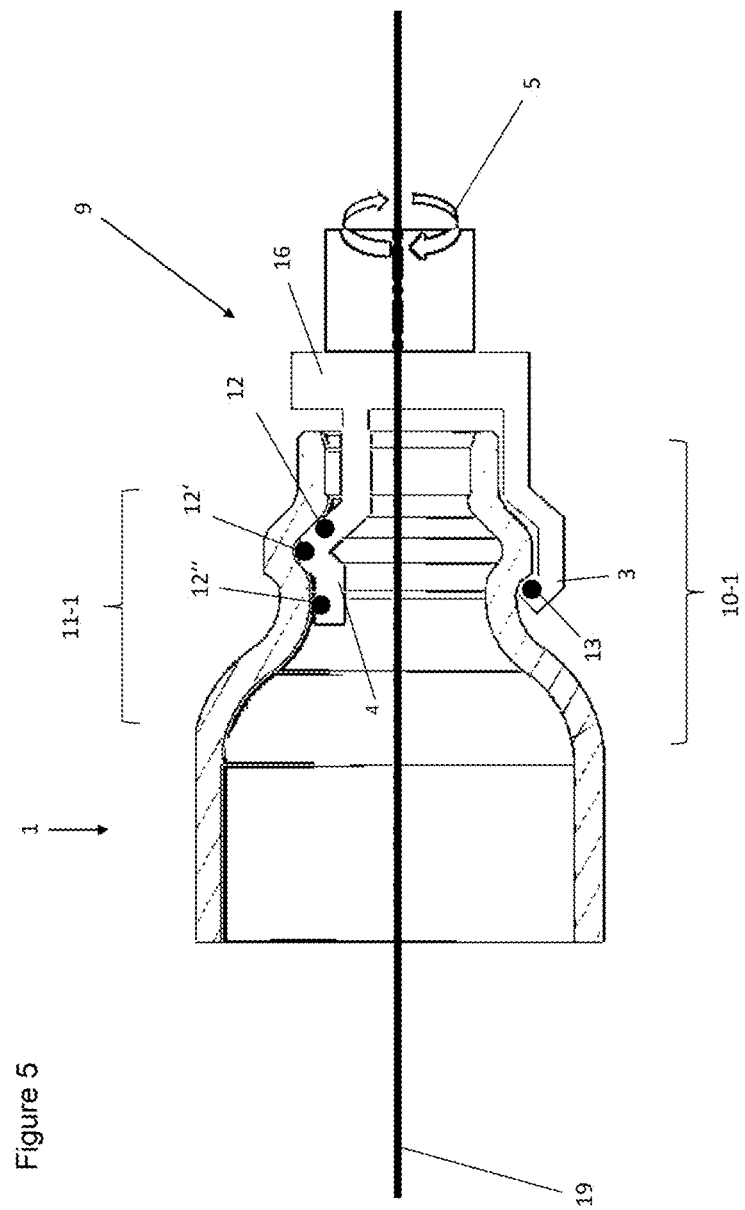
FIG. 5: illustrates the testing of an end portion of a further tube product at the end of testing using a further test probe according to the invention.

FIG. 5 shows the testing of an end portion of a further tube product 1 at the end of testing using a further test probe 9 according to the invention. The end regions 10-1 of the tube product in this figure do not narrow this time, but rather a transition region 11-1 of said tube product has a bead directed toward the outside of the tube. The test probe 9 used here is this time not rotationally symmetrical about its axis of rotation, which corresponds to the central longitudinal axis 19 of the tube product. Instead, the test probe 9 has a web 16, at one end of which is arranged an arm 3 which is provided on its inner wall 17 with an eddy current sensor 13, in order to test the outer wall 8 of the tube product in the region of the bead. The test probe also has a holding element 4, which here likewise is in the form of an arm and is arranged on the web 16 opposite the arm 3. This holding element 4 is fitted with three eddy current sensors 12, 12' and 12" for testing the inner wall 7 of the tube product 1 in the region of the bead of the end region 10-1. In this case, the arm 3 and the holding element 4 are at different distances from the axis of rotation of the test probe 9, with the result that, when the test probe 9 is rotating, the holding element 4 is guided along on the outer wall 8 of the tube product 1 in its end region 10-1, while the holding element is guided along on the inner wall 7 of the tube product 1 in its end region 10-1.

The embodiments of the invention described in FIGS. 4 and 5 are tested as follows. Before and/or during the testing of the tube product 1, the test probe 9 is moved into and over the end region 10-1 or 10-2 to be tested in such a way that at the same time or successively it is guided along a central longitudinal axis 19 of the tube product 1 and radially in relation to the tube axis 19, in order for the arm 3 and the holding element 4 to reach the undercut, formed by the transition region 11-1 or 11-2, without collision. After the measurement has ended, the test probe 9 is correspondingly moved away from the end region 10-2 parallel and transversely to the central longitudinal axis 19 without collision.

Figure 6:
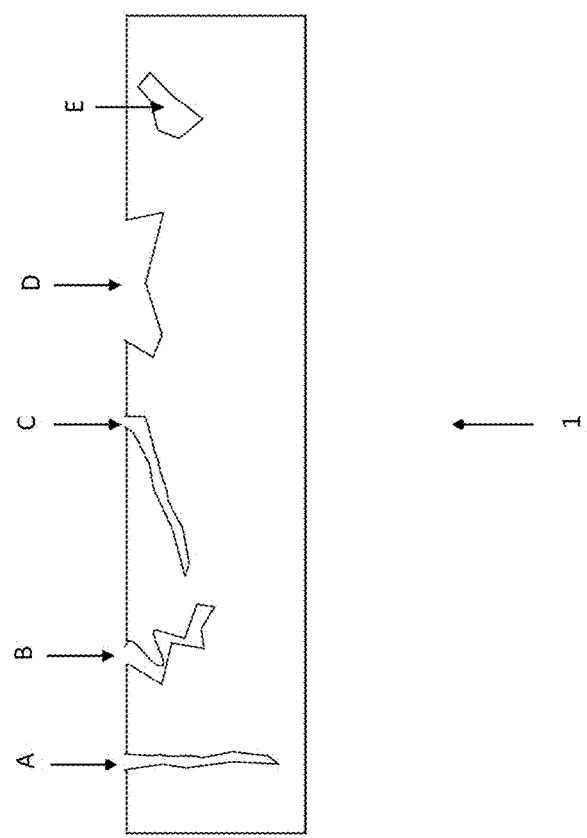
FIG. 6: illustrates various types of defect which can occur in a tube product according to the invention.

By way of example and non-exclusively, FIG. 6 illustrates defects in a wall of a tube product 1 according to the invention which can be detected by means of testing using the method according to the invention. In this respect, it is possible to reliably detect both various surface defects A, B, C, D and also embedded defects E during testing and to visually display them using known methods on known imaging devices, such as for example screens.

In terms of the embedded defects E, the detection rate also depends on the power of the eddy current sensors used to test the tube product 1. It fundamentally applies here that the higher the power, the greater also the detection depth.

The surface defect A is a more or less perpendicular crack in the surface of the tube product 1, while the surface defect B constitutes a crack which changes direction repeatedly with increased penetration depth. The surface defect C is a more or less straight crack which, however, does not run at right angles to the surface of the tube product, by contrast to surface defect A. The surface defect D is not so much a crack in the surface of the tube product, since its penetration depth is relatively low by contrast to the surface defects A, B, C. Rather, the surface defect D is in the form of a crater-like surface defect.

All of the surface defects shown in FIG. 6 can be detected reliably and precisely by the method according to the invention. In comparison with ultrasonic testing, eddy current testing has the advantage that it can be carried out dry. In this respect, in comparison with ultrasonic testing, the result is not just a saving of a few seconds of time by virtue of the fast surface testing inherent to eddy current testing. It is also the case that no time is expended on drying the tube product, with ultrasonic testing using the "wet" testing method possibly also giving rise to corrosion problems in the tube products which cannot arise in eddy current testing.

LIST OF REFERENCE SIGNS

1 Tube product
2 First arm
3 Second arm
4 Holding element
5 Rotational movement
6 Axial movement
7 Inner wall
8 Outer wall
9 Test probe
10-1 End region 10-2 End region
11-1 Transition region
11-2 Transition region
12 Eddy current sensor
13 Eddy current sensor
14 Eddy current sensor
15 Eddy current sensor
16 Web
17 Inner wall
18 Inner wall
19 Central longitudinal axis
A Surface defect
B Surface defect
C Surface defect
D Surface defect
E Embedded defect

What is claimed is:

1. A method for producing and testing a tube product of steel, comprising:
   a) providing a steel tube,
   b) forming the steel tube to afford the tube product, with the steel tube being formed at least in one end region of the tube product, wherein the at least one end region has a transition region with a varying diameter on its inner and outer surface between a formed reduced cross section of the tube product and the cross section of the steel tube provided, wherein the tube product has a tensile strength of at least 900 MPa and a transition temperature below 233.15 Kelvin,
   c) testing an inner wall and an outer wall in at least one formed end region of the tube product for defects using at least one test probe, which is matched to at least one formed end region and comprises at least one eddy current sensor for testing the inner wall and at least one eddy current sensor for testing the outer wall of the at least one end region of the tube product, with multiple eddy current sensors being provided on at least one arm and/or multiple eddy current sensors being provided on an inner part, wherein the testing comprises positioning at least one eddy current sensor of the test probe in the transition region, and
   d) testing for defects in the transition region.

2. The method as claimed in claim 1, wherein, in step c), the inner wall and the outer wall are tested at the same time.

3. The method as claimed in claim 1, wherein the inner wall and the outer wall of the at least one formed end region of the tube product are tested in such a way that the tube product is fixed and the test probe is moved in rotation axially over the at least one formed end region of the tube product, with both the inner wall and the outer wall of the at least one formed end region of the tube product being checked for defects by means of the eddy current sensors.

4. The method as claimed in claim 1, wherein the inner wall and the outer wall in the at least one formed end region of the tube product are tested after final production steps, in particular after the forming according to step b), and in particular cyclically linked therewith.

5. The method as claimed in claim 1, wherein the testing takes place after demagnetization of the at least one formed end region.

6. The method as claimed in claim 1, wherein the steel tube provided consists of a steel alloy, which, apart from iron and melting-related impurities, comprises the following alloy elements in percent by mass:
   C (0.07% to 0.50%; preferably 0.08% to 0.15%),
   Si (0.01% to 0.60%; preferably 0.01% to 0.50%),
   Mn (0.3% to 1.7%; preferably 1.0% to 1.7%),
   Cr (at most 1.2%; preferably 0.2% to 0.9%),
   Mo (at most 1.2%; preferably at most 0.2%),
   Ni (at most 0.4%; preferably 0.15% to 0.4%),
   Al (0.01% to 0.10%),
   V (at most 0.15%),
   Nb (at most 0.06%) and
   Ti (at most 0.06%).

7. The method as claimed in claim 1, wherein the tube product comprises a microstructure of expanded, tempered martensite and the microstructure of the expanded, tempered martensite has an average martensitic packet size of $d_{avg} < 3$ μm.

8. The method as claimed in claim 1, wherein the testing is performed at different measuring frequencies or sensitivities in order to detect different types of defect and/or defect depths.

9. The method as claimed in claim 1, wherein testing for defects in the transition region is effected by moving an eddy current sensor in an undercut of the transition region of the inner or outer wall.

10. A test probe, in particular for use in a method as claimed in claim 1, which comprises a web which interconnects at least one arm, on the inner and/or outer walls of which at least one respective eddy current sensor is arranged, and a holding element for receiving at least one eddy current sensor.

11. The test probe as claimed in claim 10, wherein the holding element is attached on the web equidistantly from a first and a second arm.

12. The test probe as claimed in claim 11, which is in the form of a rotary body about a central longitudinal axis, with the web being in the form of a circular disk, the two arms together being in the form of a hollow body with a circular inner face, and the holding element being in the form of a body with a circular outer face.

13. A tube product, in particular airbag tube, produced by a method as claimed in claim 10.

14. The method as claimed in claim 1, wherein the inner wall and the outer wall are tested using the same type of test.

15. The method as claimed in claim 14, wherein the inner wall and the outer wall are tested once.

* * * * *